(12) United States Patent
Aiba

(10) Patent No.: US 7,234,273 B2
(45) Date of Patent: Jun. 26, 2007

(54) POTS FOR RAISING ROOT CROP SEEDLINGS

(76) Inventor: Toshiyuki Aiba, 18-73, Nishikiori, 1-chome, Otsu-shi, Shiga (JP)

( * ) Notice: Subject to any disclaimer, the term of this patent is extended or adjusted under 35 U.S.C. 154(b) by 121 days.

(21) Appl. No.: 10/535,398

(22) PCT Filed: Nov. 18, 2002

(86) PCT No.: PCT/JP02/12025

§ 371 (c)(1),
(2), (4) Date: May 18, 2005

(87) PCT Pub. No.: WO2004/045270

PCT Pub. Date: Jun. 3, 2004

(65) Prior Publication Data

US 2006/0150499 A1    Jul. 13, 2006

(51) Int. Cl.
*A01G 9/02* (2006.01)
(52) U.S. Cl. .................................... 47/65.7
(58) Field of Classification Search ............... 47/67.5, 47/65.5
See application file for complete search history.

(56) References Cited

U.S. PATENT DOCUMENTS 4,972,627 A * 11/1990 Hori et al. ................ 47/64

2006/0032122 A1 * 2/2006 Chang .................. 47/58.1 SE

FOREIGN PATENT DOCUMENTS

| CN | 1268283 A | * | 10/2000 | |
|---|---|---|---|---|
| CN | 1393122 A | * | 1/2003 | |
| CN | 1706321 A | * | 12/2005 | |
| EP | 355250 A1 | * | 2/1990 | .......... 47/74 |
| EP | 384133 A1 | * | 8/1990 | .......... 47/74 |
| EP | 1568269 A1 | * | 8/2005 | |
| JP | 2249427 A | * | 10/1990 | .......... 47/74 |
| JP | 3019628 A | * | 1/1991 | .......... 47/74 |
| JP | 2001045875 A | * | 2/2001 | |
| JP | 2001231372 A | * | 8/2001 | |
| JP | 2002262671 A | * | 9/2002 | |
| JP | 2002335769 A | * | 11/2002 | |
| JP | 2004034508 A | * | 2/2004 | |
| JP | 2005333850 A | * | 12/2005 | |
| US | 20060032122 A1 | * | 2/2006 | .......... 47/58.1 |
| WO | WO0182682 A1 | * | 8/2001 | |

\* cited by examiner

*Primary Examiner*—Francis T. Palo
(74) *Attorney, Agent, or Firm*—Antonelli, Terry, Stout & Kraus, LLP.

(57) ABSTRACT

Molded pots for root crop seedlings are produced by molding a mixture comprising unboiled bamboo fiber, a boiled fiber material of a grass plant, lespedeza, etc., a carbonized vegetable material having been carbonized by heating and urea optionally together with a silicon dioxide powder.

8 Claims, 4 Drawing Sheets

POTS FOR RAISING ROOT CROP SEEDLINGS

INDUSTRIAL FIELD OF THE INVENTION

The present invention relates to a seedling pot for raising root crop seedlings such that a main material and a supplementary material added thereto do constitute the seedling pot. The main material is chosen herein from nonwoody fibers, with the supplementary material facilitating the desired healthy growth of any particular seedlings, also resolving the problems of environmental pollution.

PRIOR ART

As known widely, the prior art seedling pots have usually been flower-pot miniatures molded using a proper plastics sheet such as a polyvinyl chloride resin. Those plastics pots are cheap but cost much labor because the seedlings should be removed from the pots, prior to transplantation to a farm or larger pots. A clod of soil around the root of each seedling is likely to be broken to injure the root, thereby adversely affecting growth of the seedling thus transplanted. The burning of those discarded seedling pots has undesirably caused environmental pollution. In some proposals that have been made in view of these problems and are going to be employed in the art, certain agricultural and/or forestry wastes are salvaged to manufacture seedling paper-made pots.

After use of such papery pots already proposed and economically made of those natural wastes, they can be left on and/or in the earth. They will undergo a fast biological decomposition in situ, resolving one of the drawbacks inherent to the prior art plastics pots. Thus, they may be expected to be advantageous insofar as assessed on their economical and environmental merits. Material composition and configuration of such papery pots have however not been researched, though they must affect on growth of the respective botanical kinds of seedlings. No attention has been paid on what requirements the papery pots should meet for raising the particular seedlings that might be root crops, fruit crops (i.e., fructifying vegetables) or green foliar vegetables. Under such circumstances, none of the already proposed type papery pots did prove useful to raise all the kinds of seedlings. Therefore, it has been long and eagerly demanded to develop a seedling pot not only advantageous economically and environmentally but also capable of meeting particular requirements which any desired type of seedlings being raised would show.

DISCLOSURE OF THE INVENTION

An object of the present invention is therefore to provide a seedling pot particularly adapted for use to raise the seedlings of farm products that are generally called root crops including radishes, potatoes, burdocks, lily bulbs and the like. The seedling pot, that will be mass-produced herein using inexpensive vegetable materials and certain other materials not widely utilized in this field, has to be designed and composed in principle such that growth of a taproot, an underground stem, a tuber or the like important organs will be facilitated. Also, this seedling pot that can inexpensively be manufactured herein as suggested above has to be tenacious, safe and harmless to handle. When discarding this pot after use, it may usually be left in the earth so as to be ready for biological decomposition in situ, or may alternatively be burnt without generating any toxic substance.

According to the present invention, a seedling pot for root crops may be molded using a mixture of an unboiled bamboo fiber, a boiled fiber of Gramineae or Leguminosae plant (such as *Lespedeza bicolor*, viz., Japanese bush clover), a carbonized plant material obtained by roasting a nonwoody plant, and urea as an additive. From another aspect, the invention provides a seedling pot for root crops may be molded using another mixture of an unboiled bamboo fiber, a boiled fiber of Gramineae or Leguminosae plant (such as Japanese bush clover), a carbonized plant material obtained by roasting a nonwoody plant, urea as an additive, and a powder substantially consisting of silicon dioxide.

In the preferred embodiments, the first ingredient of the mixture of raw plant materials as mentioned above may be composed of about 7 to 10% by weight of an antibacterial bamboo fiber originating from bamboo stems, branches, skins and/or cores. Blended with this antibacterial bamboo fiber may be about 50 to 60% by weight of the boiled fiber prepared from a ditch reed (viz., *Phragmites communis*) or Japanese bush clover, about 20 to 30% by weight of the carbonized material prepared by roasting a buck-wheat chaff, tea dregs, oil cakes, or using already-roasted coffee grounds (needing not be roasted again), and about 15% by weight of urea. This mixture will be heated and compressed in a mold at a temperature of 180° C. or higher, preferably about 200° C., at a pressure of 3-6 kg/cm$^2$ and for a time of 24-30 sec. Such a molding process does not need any binder such as a sizing agent that is generally used in the papermaking mills, because hydrogen bonds acting between the fibers will firmly adjoin them together to give a desired shape to the pot thus molded. Instead of direct thermal compression in the mold of a desired cavity shape, the bamboo fiber, the boiled fiber and carbonized plant material may alternatively be suspended first in water to form a slurry. This slurry will then be filtered through a paper-making screen, before thermally pressed in a mold. The antibacterial bamboo fiber contained in the peripheral wall of the seedling pot will retard and inhibit any lateral roots of the seedling from growing towards said wall. As a result, the taproot of this seedling will preferentially receive and utilize the nutritive compounds that are present around it, thereby producing an excellent root crop seedling.

By virtue of spontaneous and biological decomposition of the pots in the earth, they need no longer be removed when the seedlings are transplanted. Labor consumption for transplantation will thus be saved as compared with the case of using the conventional plastics pots. The carbonized material contained in the pot wall will provide a noticeable amount of carbon to react with urea so that nitrogen and/or its compounds are produced to serve as one of the nutritive substances.

About 2-5% by weight of silicon dioxide ($SiO_2$) may be added to the described composition of seedling pots. A powder of quartz may be used as the main component of said silicon dioxide expected to enable repeated cultivation of the same crop on the same ground. It has been reported that *Fusarium* bacteria would cause putrefaction of watery soil fractions, resulting in inhibition of said repeated cultivation. However, the added silicon dioxide powder will induce wave propagation through the water in soil fractions, thereby protecting them from putrefaction.

Similarly to the conventional flowerpots, the seedling pot as molded above may have through its bottom a central drainage hole (1). Outward protrusions (3) and outward grooves (4) do all surround the central hole in order to prevent it from becoming clogged. The seedling pot will be biologically decomposed in about two months, if left in the ground. This period will generally correspond to a time lapse from transplantation to the point of time when the pot's periphery start to interfere with the lateral roots growing sideways. Length of such a time lapse does naturally depend on the sorts of crops, and perforations (2) formed in and through the periphery and/or bottom of seedling pot will be useful to expedite biological decomposition thereof. The number of such perforations may typically be one or more, and 12 (twelve) or more or less. About 2% by weight of a water repellent may be added to the composition of said pot so as to retard biological decomposition by a few or several months. Such a prolonged life of pot in the ground will be convenient to cultivation of bulbous crops or to any grafted plants.

The seedling pot provided herein for raising root crops will autonomically vary its moisture content within a wide range of 7 to 25%.

If ambient humidity rises, then the pot will absorb moisture, tending to lower its humidity. If contrarily ambient humidity descends, then the pot will desorb moisture, tending to increase its humidity. By virtue of such an autonomical control of humidity, this pot will adjust itself to a temporary ambient dryness during usage for raising seedlings. Further, the seedling pot of the invention is superior to the polyvinyl chloride pots in its property of keeping warmth (18° C.-10° C.), making itself suited for use in cold zones.

The raw materials used herein to produce the seedling pot of the invention have been useless wastes, so that such cheaper materials will lower manufacture cost. Even if the pots have to be thrown away after use, they can be burnt at such lower temperatures that any trash burner or the like will neither be injured, nor generating any amount of dioxines. In a case wherein the used pots are left in the grounds, they will be biologically decomposed by bacteria and/or enzymes to thereby give certain nutritive compounds, thus contributing to soil improvement and environment purification.

BEST MODES OF CARRYING OUT THE INVENTION

Figure 1:
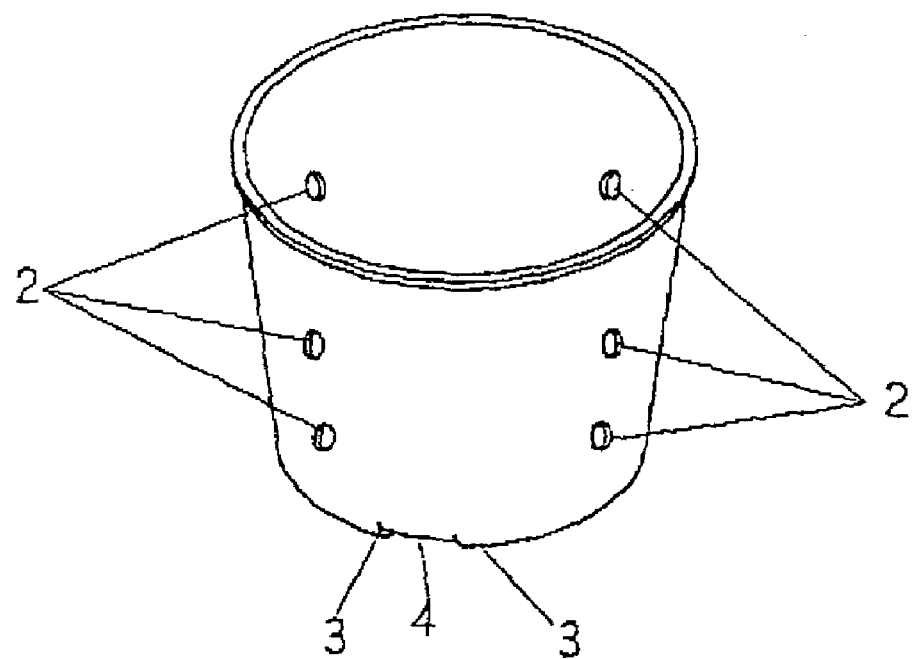
FIG. 1 is a perspective view of a seedling pot provided in a first embodiment of the invention, the pot being designed for use to raise root crop seedlings.
Figure 2:
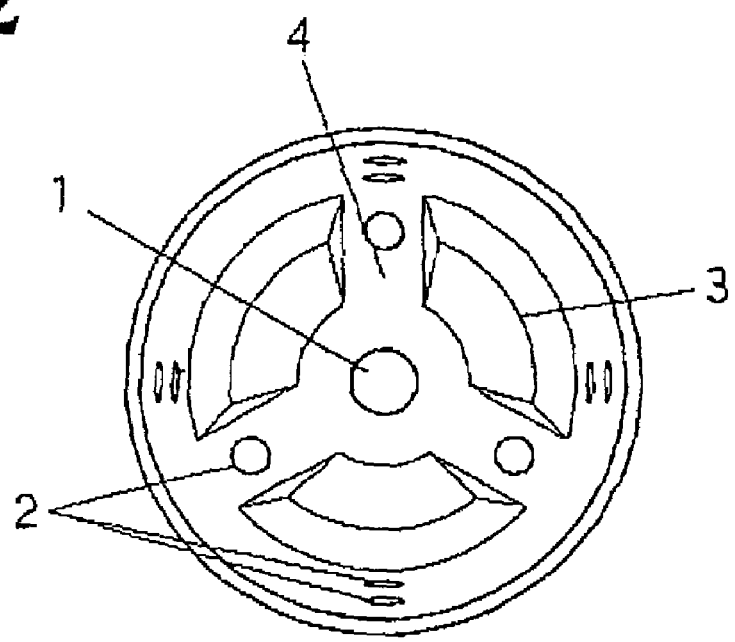
FIG. 2 is a plan view of the seedling pot shown in FIG. 1.
Figure 3:
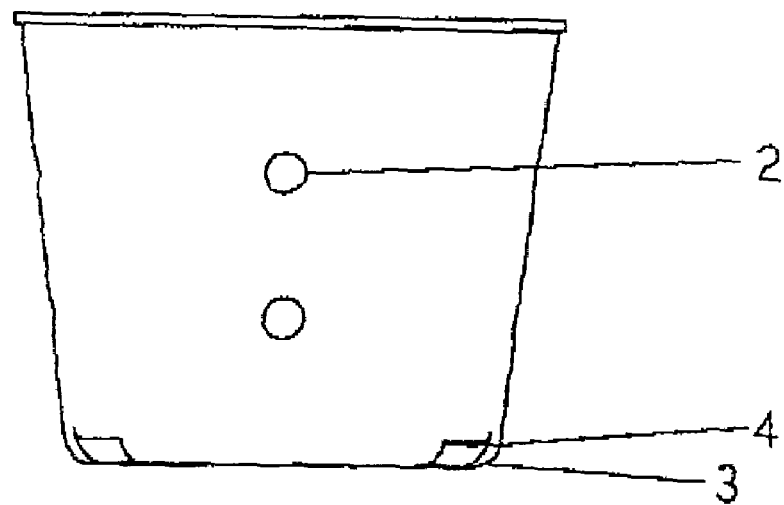
FIG. 3 is a front elevation of the seedling pot shown in FIG. 1.
Figure 4:
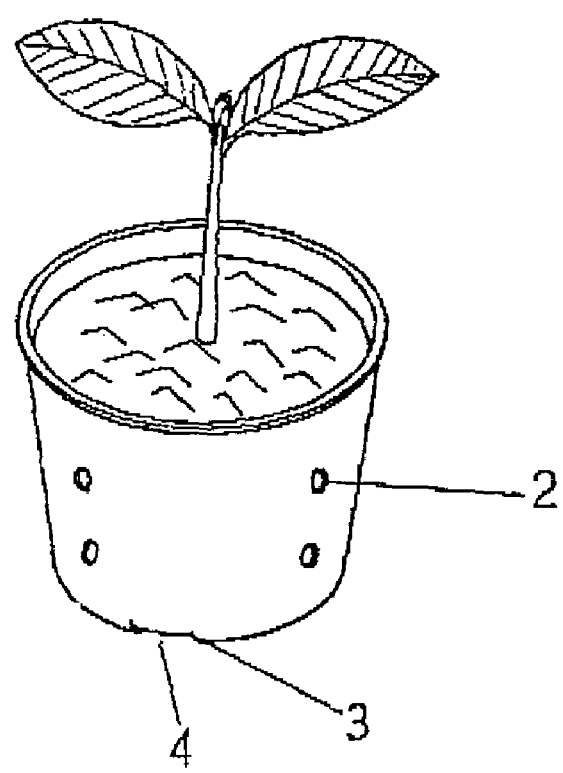
FIG. 4 is a perspective view of the seedling pot as shown in FIG. 1 and in use.

Now, the first embodiment of the present invention will be described referring to FIGS. 1 to 4. A material mixture for molding and constituting the pot is composed of about 10% by weight of unboiled bamboo fiber, about 60% by weight of boiled fibers of ditch reed and Japanese bush clover, and about 30% by weight of roasted and carbonized buckwheat chaff, tea dregs and the like. The mixture further containing about 15% by weight of urea, well blended therewith, is molded at 200° C., at a pressure of 3 kg/cm$^2$ for 24 sec. Hydrogen bonds cause these fibers to firmly stick one to another to give a molded piece of the shape as a seedling pot. The seedling pot of the first embodiment resembles a flowerpot, and has in its bottom a central drainage hole 1, outward protrusions 3 and grooves 4 in communication with the hole. The protrusions 3 and grooves 4 alternating therewith are arranged in horizontal directions, radially and outwardly from the central hole 1. This pot has 8 (eight) perforations 2 in its periphery, and one in each of three radial outward grooves 4, thus the total number of those perforations is 11 (eleven). In manufacture, a primary molding step will produce a circular flash continuing from a rim around the open top of this pot. Therefore, a secondary molding step will be conducted to remove such a flash and form at the same time the central hole and the perforations. FIGS. 1 to 3 show the appearance of this seedling pot, with FIG. 4 illustrating it in use and a seedling planted and growing therein.

Figure 5:
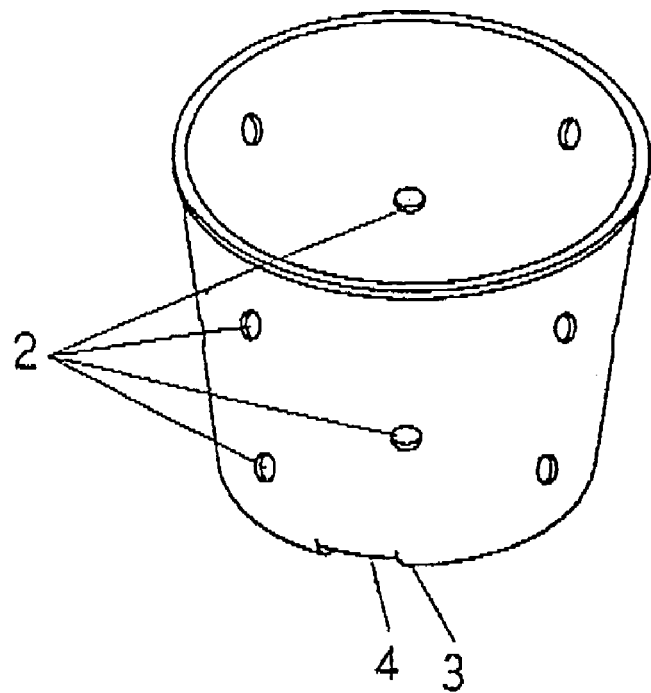
FIG. 5 is a perspective view of a seedling pot provided in a second embodiment of the invention, the pot also being designed for use to raise root crop seedlings.
Figure 6:
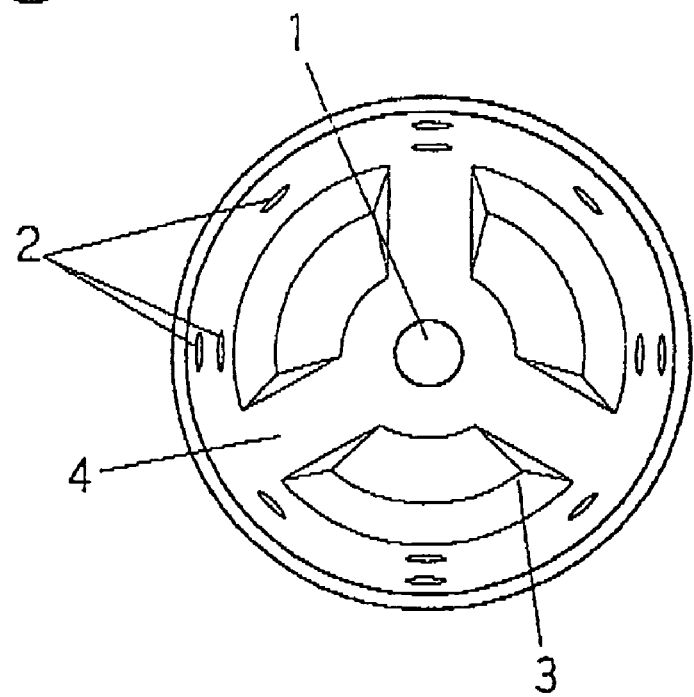
FIG. 6 is a plan view of the seedling pot shown in FIG. 5.

In a second embodiment as shown in FIGS. 5 and 6, unboiled bamboo stems, branches, skins and/or cores are ground to give chips finally forming a powder pulp. About 10% by weight of this powder pulp is mixed with about 30% by weight of boiled ditch reed, about 30% by weight of boiled Japanese bush clover and about 30% by weight of roasted and carbonized buckwheat. This mixture is then stirred in water within a dissolver so as to provide a suspension, before about 5% by weight of urea will be blended therewith to give a molding composition. A papermaking screen is used to form from this composition a web that is then molded at 200° C., at a pressure of 3 kg/cm$^2$ for 30 sec. A seedling pot thus obtained as shown in FIGS. 5 and 6 has only in its periphery 12 (twelve) perforations 2. Although the kinds of raw materials and the conditions for molding same do differ from those in the first embodiment, the seedling pot of the second embodiment does nevertheless have a structure and show its performance, both within a scope of the present invention.

Figure 7:
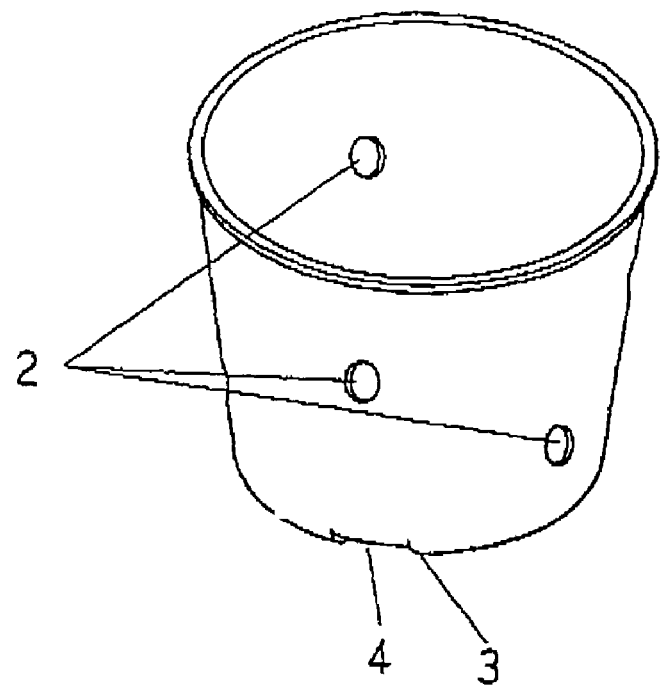
FIG. 7 is a perspective view of a seedling pot provided in a third embodiment of the invention, the pot being likewise designed for use to raise root crop seedlings.
Figure 8:
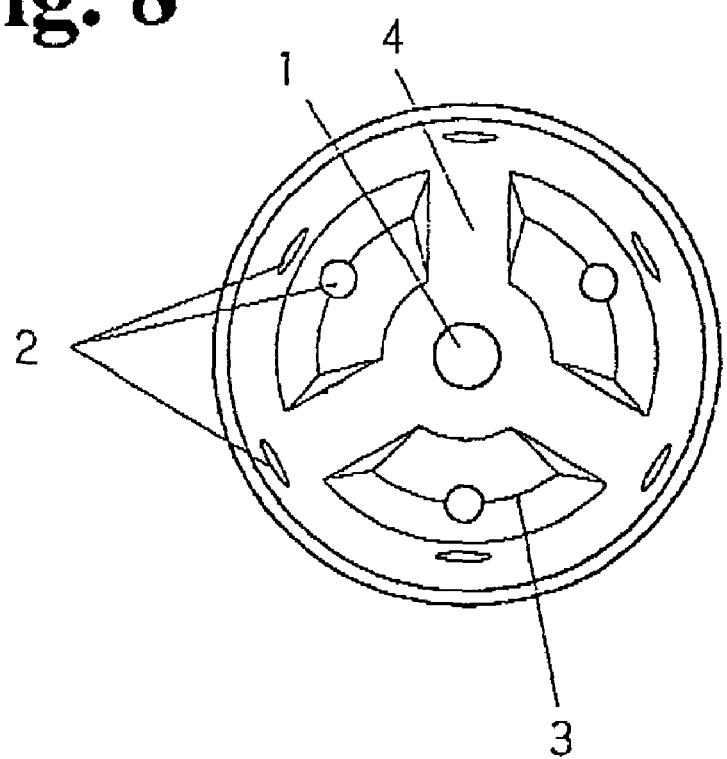
FIG. 8 is a plan view of the seedling pot shown in FIG. 7.

In a third embodiment shown in FIGS. 7 and 8, about 10% by weight of bamboo fiber is mixed with about 60% by weight of ditch reed or Japanese bush clover and 30% by weight of roasted and carbonized buckwheat or tea dregs. This mixture is blended with about 5% by weight of urea as well as 2% by weight of quartz powder, before molded in the same manner as in the first embodiment so as to give a seedling pot as shown in FIGS. 7 and 8. 6 (six) perforations 2 are formed in the periphery, and arranged in a staggered pattern, and one perforation is formed in each of the three protrusions 3 in bottom. Thus, the total number of perforations 2 in this case is 9 (nine).

The invention claimed is:

1. A pot for raising root crop seedlings, comprising a mixture of unboiled bamboo fiber and boiled fiber from at least one of a Gramineae or Leguminosae plant family, the mixture further including charcoal from a nonwoody plant material and urea.

2. A molded pot for raising root crop seedlings, comprising a mixture of unboiled bamboo fiber, and boiled fiber from at least one of a Gramineae or Leguminosae plant family, the mixture further including charcoal from a nonwoody plant material, urea and a powder whose main component is silicon dioxide.

3. The molded pot as defined in claim 2 and having a bottom and a periphery, wherein at least one perforation is formed in either of or both the bottom and periphery.

4. The molded pot as defined in claim 2, wherein the nonwoody plant material is buckwheat or tea dregs.

5. The molded pot as defined in claim 1 and having a bottom and a periphery, wherein at least one perforation is formed in either of or both the bottom and periphery.

6. The molded pot as defined in claim 1, wherein the nonwoody plant material is buckwheat or tea dregs.

7. The molded pot as defined in claim 1, wherein the boiled fiber comprises boiled fiber of Japanese bush clover.

8. The molded pot as defined in claim 2, wherein the boiled fiber comprises boiled fiber of Japanese bush clover.

\* \* \* \* \*